(12) United States Patent
Kolson et al.

(10) Patent No.: US 6,240,735 B1
(45) Date of Patent: Jun. 5, 2001

(54) ROTARY DAMPER ASSEMBLY

(75) Inventors: John A. Kolson, Export; Robert W. Starenchak, Greensburg; Douglas C. Lanz, Irwin, all of PA (US)

(73) Assignee: Robertshaw Controls Company, Richmond, VA (US)

( * ) Notice: Subject to any disclaimer, the term of this patent is extended or adjusted under 35 U.S.C. 154(b) by 0 days.

(21) Appl. No.: 09/506,998

(22) Filed: Feb. 18, 2000

(51) Int. Cl.[7] .............................. F25B 39/04; G05D 23/00
(52) U.S. Cl. ................................................ 62/187; 165/294
(58) Field of Search ........................... 62/187, 186, 177, 62/132, 336, 337, 387, 404; 137/625.65; 310/162; 454/454; 123/41.04, 534; 165/294 239/456

(56) References Cited

U.S. PATENT DOCUMENTS

| | | | |
|---|---|---|---|
| 4,663,943 | * 5/1987 | Dyment et al. | 62/250 |
| 4,890,792 | * 1/1990 | Martin et al. | 239/343 |
| 4,914,928 | * 4/1990 | Fellwock et al. | 62/408 |
| 5,097,675 | * 3/1992 | Elsom et al. | 62/408 |
| 5,441,403 | * 8/1995 | Tanaka et al. | 431/175 |
| 5,449,054 | * 9/1995 | Wiese et al. | 188/296 |
| 5,460,252 | * 10/1995 | Kosugi et al. | 188/291 |
| 5,477,699 | 12/1995 | Guess et al. | 62/187 |
| 5,518,223 | * 5/1996 | Bivens | 267/34 |
| 5,554,901 | 9/1996 | Wendel et al. | 310/162 |
| 5,642,628 | * 7/1997 | Whipple, III et al. | 62/186 |
| 5,722,460 | 3/1998 | Olsen et al. | 137/625.65 |
| 5,816,061 | 10/1998 | Lee et al. | 62/187 |
| 5,896,749 | 4/1999 | Livers, Jr. et al. | 62/187 |
| 5,988,329 | * 11/1999 | Evans, Jr. et al. | 188/296 |
| 6,036,117 | * 3/2000 | Heren et al. | 239/456 |
| 6,094,932 | * 8/2000 | Chiappetta | 62/408 |
| 6,098,765 | * 8/2000 | Kato et al. | 188/290 |

* cited by examiner

Primary Examiner—Teresa Walberg
Assistant Examiner—Daniel Robinson
(74) Attorney, Agent, or Firm—Moore & Van Allen, PLLC; Dominic J. Chiantera

(57) ABSTRACT

A rotary damper assembly for controlling the flow of a fluid includes inner and outer hollow cylinders, each having one or more side wall apertures, the inner cylinder being nested within the outer cylinder in a manner to permit relative axial rotation of the cylinders about a common longitudinal axis, the inner cylinder receiving the fluid flow at an axial inlet, and the flow of fluid through the assembly being proportional to the degree of alignment of the cylinder apertures.

29 Claims, 5 Drawing Sheets

Motor Drive Circit Schematic With Damper in OPEN Steady State

Motor Drive Circit Schematic With Damper in CLOSED Steady State

Motor Drive Circit Schematic With Damper in OPEN Steady State

ROTARY DAMPER ASSEMBLY

TECHNICAL FIELD

This invention relates to the field of pneumatic flow dampers, and more particularly flow dampers for use in the field of refrigeration devices.

BACKGROUND ART

Refrigeration equipment for providing cold storage of articles, such as residential refrigerators for storing food items, include several different temperature zones, or compartments. Common among these are a freezer compartment for maintaining sub-freezing temperatures, and a fresh food compartment for maintaining a cool temperature for fruit and vegetable produce. The known method of regulating the different compartment temperatures is to use a compressor, evaporator, and fan to provide sub-freezing air to the freezer compartment, and to bleed some of this air to cool the fresh food compartment, as necessary, to maintain the fresh food temperature between freezing and room ambient.

There are several known prior art control methods and systems for achieving this. The least cost method is to use a manually operated damper in the bleed line and a thermostat in the fresh food compartment. The refrigerator user then adjusts the damper position and the thermostat set point temperature to selected values. The thermostat then actuates the refrigeration system (i.e. compressor and evaporator fan) to control the cool air flow to the freezer in response to the actual fresh food compartment temperature being above and below the thermostat set point. The freezer temperature then is dependent on the fresh food compartment set point temperature and the damper position. This has several drawbacks, including the instability of the freezer temperature, as well as longer operating cycle times of the compressor and evaporator fan. This results in higher operating costs due to the lower electrical efficiency of the refrigeration system.

A less common, but more expensive type control system used in "high performance" refrigerators (approximately 15% of to the refrigerators produced in the United States) is to use a freezer compartment thermostat to control actuation of the refrigeration system and to modulate the cool air flow to the fresh food compartment with a damper which is automatically positioned by a refrigerant charged bellows. The bellows expands and contracts in response to the fresh food compartment temperature, and positions the damper in a manner to maintain the fresh food compartment temperature within a user selected temperature range. This provides direct control of the freezer temperature, and since the bellows temperature characteristics are predictable, this system provides more accurate temperature control of both compartments.

Despite the improved efficiency of the more expensive system, the controlled temperature of both compartments still varies over a substantial range of temperatures. This is due to the passive nature of both of these control functions, which is characterized by greater operating tolerances as well as limited response time. Alternatively, the growing use of microcontroller and microprocessor based controls in residential appliances now makes them cost effective for use in residential refrigerators. They provide increased control accuracy, faster response, and lower refrigeration cycle times, all of which result in higher efficiency and lower operating costs to the consumer.

Within these electronic control type systems, however, there remains the need for mechanical damper assemblies. To further improve the operating efficiency of the electronic controls these mechanical damper assemblies must preferably be capable of operating in a gated manner; i.e. in an open/closed sequence at a given duty cycle, as determined by the electronic control. The ideal damper assembly therefore must itself be capable of fast response as well as efficient air flow characteristics.

DISCLOSURE OF INVENTION

One object of the present invention is to provide an improved efficiency damper assembly. A further object of the present invention is to provide a mechanical damper assembly capable of gated operation between a full open and a full closed position. A still further object of the present invention is to provide a mechanical damper assembly capable of faster response times in achieving a commanded position.

According to the present invention, a damper assembly for controlling the flow of a fluid includes concentric inner and outer hollow cylinders, the inner cylinder being adapted to receive the fluid flow and to be nested within the outer cylinder in a manner which permits relative axial rotation of the cylinders about a common longitudinal axis, each cylinder having a side wall aperture for providing a fluid flow path therethrough, whereby the flow of fluid through the assembly is proportional to the degree of alignment of the cylinder apertures. In further accord with the present invention, the outer surface of the inner cylinder side wall includes fluid sealing members disposed thereon which restrict the fluid flow path through the assembly to the side wall apertures. In still further accord with the present invention the fluid sealing members are disposed circumferentially along each longitudinal end of the inner cylinder. In still further accord with the present invention, fluid sealing members are disposed longitudinally along the inner cylinder, at least one on each side of the inner cylinder side wall aperture.

In yet still further accord with the present invention, the damper assembly includes a source of rotational motive power which is adapted to engage with and rotate the inner cylinder relative to the outer cylinder, the source of motive power being selectably actuated to rotate the inner cylinder to establish a degree of registration of the apertures as necessary to provide a desired amount of fluid flow through the assembly. In yet still further accord with the present invention the outer cylinder is stationary relative to axial rotation of the inner cylinder. In yet still further accord with the present invention, the damper assembly includes a position control device which de-actuates the source of motive power in response to the rotational position of the inner cylinder at one or more selected locations corresponding to a desired relative positioning of the side wall apertures. In still further accord with the present invention, the source of motive power provides full slew axial rotation of the inner cylinder between a full flow position corresponding to substantial registration of the cylinder side wall apertures, and a minimum flow position corresponding to no overlap of any portion of the apertures.

The rotary damper assembly of the present invention provides high efficiency modulation of fluid flow through the assembly and is highly suitable for use with different electronic flow control applications, including refrigeration equipment. This efficiency is achieved through the dual cylinder configuration which provides slew rates which are compatible with gated operation as well as good fluid seal characteristics in the full closed position.

These and other objects, features, and advantages of the present invention will become more apparent in light of the following detailed description of a best mode embodiment thereof, as illustrated in the accompanying Drawing.

BEST MODE FOR CARRYING OUT THE INVENTION

Figure 1:
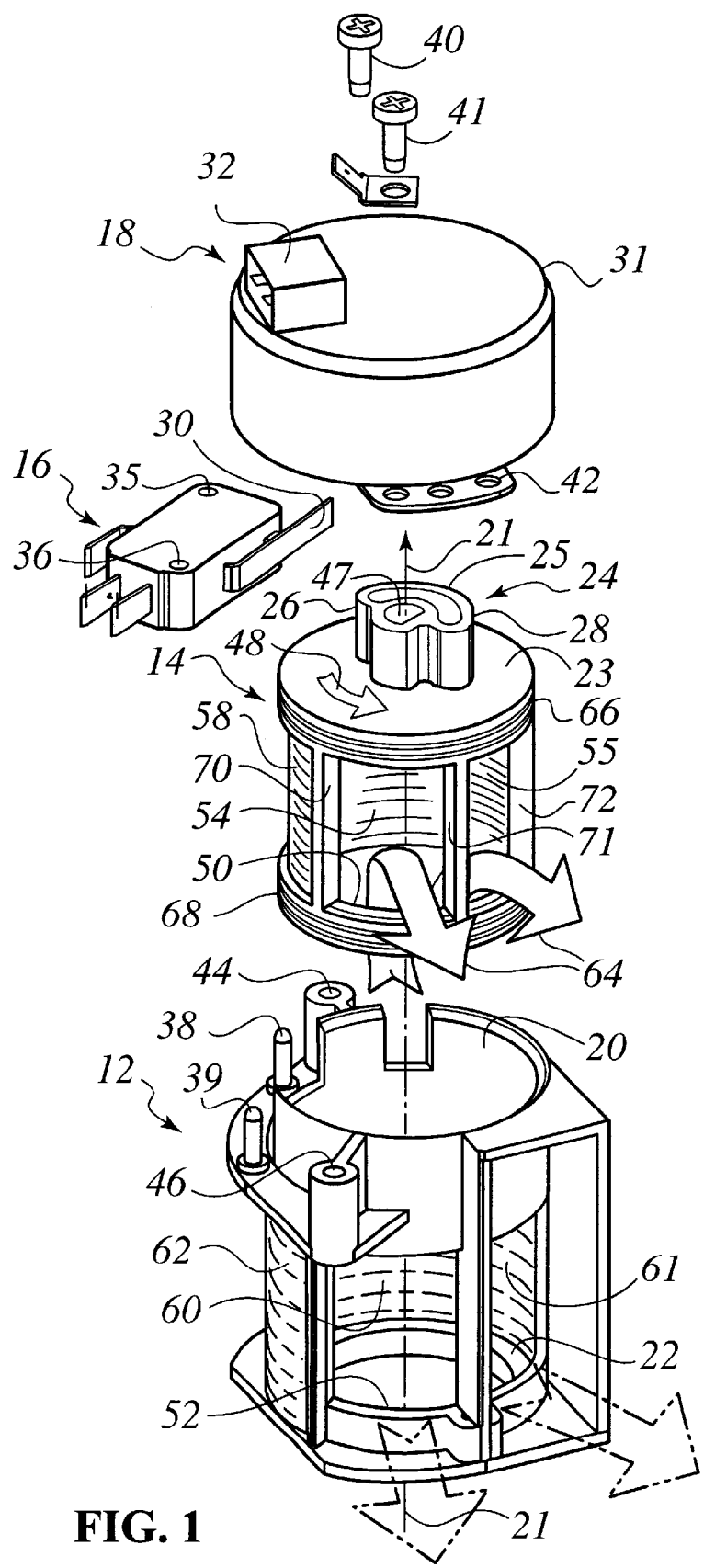
FIG. 1, is an exploded, perspective view of a best mode embodiment of the rotary damper assembly of the present invention.

FIG. 1 is an exploded, perspective illustration of the rotary damper assembly 10 of the present invention. The major elements of the assembly include an outer cylinder duct 12, an inner cylinder 14, a position switch 16, and a source of electromotive power 18. The inner cylinder 14 is adapted to be inserted within the hollow interior 20 of the outer cylinder 12 in a nested manner which permits relative axial rotation of the cylinders about a common longitudinal axis 21. A radial pedestal 22 within the interior 20 of the outer cylinder 12 provides a rest for the inner cylinder 14.

In a best mode embodiment, the outer cylinder duct 12 is fixed in position (i.e. stationary) relative to the inner cylinder 14. To identify its rotational position within the outer cylinder, one axial end 23 of the inner cylinder 14 includes a position annunciator device 24 having a contoured surface 25 which is positioned radially from the longitudinal axis 21 so as to rotates with the inner cylinder. The contoured surface 25 includes surface indicia which may be arranged in a selected scale along the contour to identify selected angular ranges of rotation of the inner cylinder, so as to allow for the detection of the inner cylinder's position relative to the outer cylinder. The purpose is to provide sensed feedback of the inner cylinder position.

In connection with the annunciator device it is important to recognize that the present rotary damper assembly is capable of different operating modes. As an example it may be desired in precision control applications to closely modulate the fluid flow. As understood by those skilled in the art this may be achieved by closed loop control of the inner cylinder position so as to have the cylinder "dither" about a position related to a degree of overlap of the outlet apertures which provide an average flow in satisfaction of the control algorithm. In this application it would be necessary to provide a reasonably gradated scale of indicia on the surface 25 to provide sufficient position resolution.

In a best mode embodiment, however, the damper assembly is operated in a gated mode in which the relative position of the nested cylinders is bistable, i.e. positioned alternately in a minimum flow and a maximum flow state.). The rotary damper assembly performance is governed by a control system (not shown) which actuates the damper in dependence on a control objective, such as controlling the average temperature in a compartment by modulating the cool air flow through the assembly into the compartment. It performs this control by gating the damper between the maximum and minimum flow state positions at the periodic frequency necessary to provide the required average temperature.

In the best mode embodiment, therefore, the contoured surface 25 is provided in a simple CAM contour, with only two endpoint surface indicia 26, 28 corresponding to a related one of the minimum flow and maximum flow states. In the final assembly 10, the position switch 16 is mounted in proximity to the position annunciator 24 in a manner which causes the indicia 26, 28 to make mechanical contact with a reed element 30 of the switch 16 in the course of inner cylinder rotation. As more fully described hereinafter, each such contact "announces" an associated rotational position of the inner cylinder.

Figure 7A:
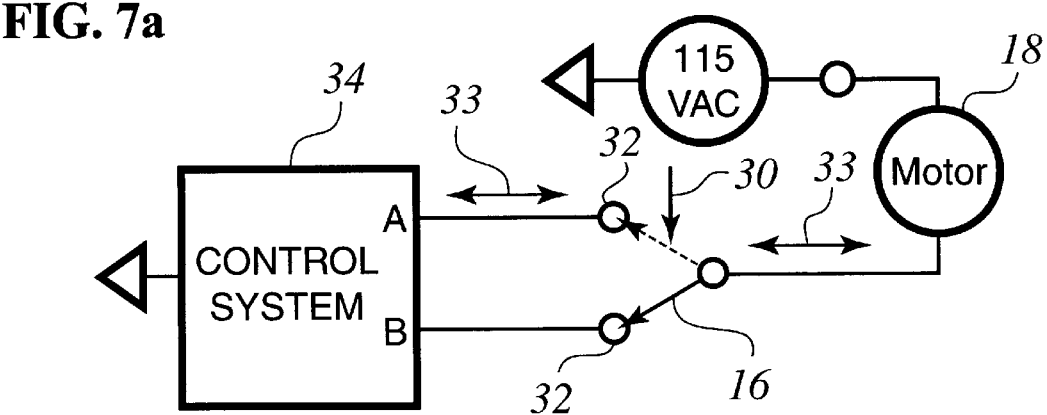
FIG. 7, illustrations (A)–(C), are schematic diagrams used in the description of operation of the rotary damper assembly embodiment of FIG. 1.
Figure 7B:
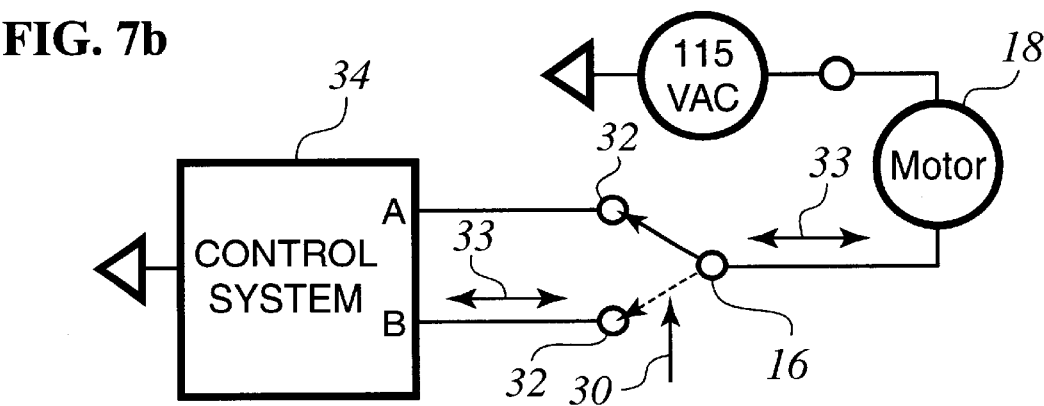
Figure 7C:
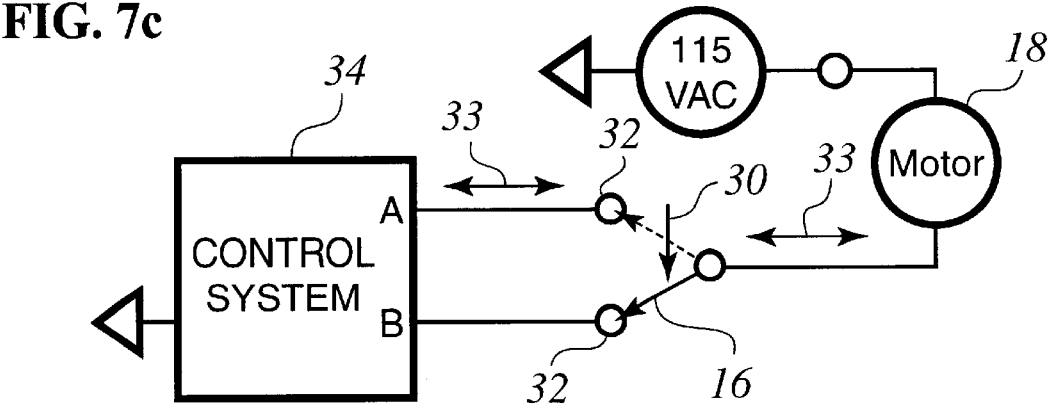

Finally, the source of motive power 18 (FIG. 7) is housed within a casing 31. In the best mode embodiment the source is an electric motor, such as a 115 volt AC (alternating current) type known in the art (not shown). The motor is actuated by having the control system apply the AC voltage signal to alternating ones of two pins in a connector 32 located on the casing 31. FIG. 7, is a series of three schematic illustrations (A.) through (C.) which demonstrate this gated control. In the present embodiment of a best mode for a damper assembly to be used for commercial refrigeration applications, the inner cylinder 14 rotates in a selected, single direction; whether clockwise or counterclockwise.

Referring to FIG. 7, illustration (A.), the electric motor 18 is actuated by a current signal 33 from the 115 VAC source. The current signal path is completed by the control system 34 through line A of connector 32 and the switch 16 (shown dashed) until the annunciator device 24 (FIG. 1) rotates to a point where one of its associated endpoints (26, 28 FIG. 1) comes in contact with, and depresses, the reed element 30 (FIGS. 1 and 7). This repositions the switch 16 to contact 32B, opening the current flow path and de-energizing the motor at one of the two damper state positions. For purposes of description it is assumed that it is in the "OPEN steady state".

Illustration (B.) assumes that the motor is actuated to slew the inner cylinder to its CLOSED position by having the control system provide a closed path for the current 33 through contact 32B and switch 16 (shown in dashed format to depict its initial position) until the opposite one of the annunciator endpoints (26, 28, FIG. 1) contacts the reed 30 and moves switch 16 to contact 32A. This stops the motor with the damper assembly in the CLOSED state. Illustration (C.) shows the current path for actuation of the motor to cycle the damper back to the OPEN position. As is evident, the cycle is continually repeated to modulate the fluid flow through the damper assembly as necessary to maintain the control system temperature setpoint in the temperature controlled compartment.

Referring again to FIG. 1, in the best mode embodiment of the assembly 10, the position switch 16 includes mounting holes 35, 36 which allow it to be removably mounted on the outer cylinder duct assembly 12 on pins 38, 39. The combination of the nested cylinders, and the switch 16 are bound in place by securing the casing 31 to the outer cylinder duct 12 by fitting fasteners 40, 41, such as screws, through flanges in the casing, such as the flange 42, and fastened into anchors 44, 46 on the duct assembly 12. Although not shown in the FIG. 1 illustration, in assembly the drive shaft of the source of motive power fits into a recess 47 formed in the annunciator 24, so as to allow the source to engage and rotate the inner cylinder. It should be understood by those skilled in the art, that although the best mode embodiment causes the inner cylinder 14 to be slewed in a constant direction between its steady state positions, in general the inner cylinder is rotatable in alternating (clockwise and counter clockwise) as figuratively illustrated by the arrow 48.

The utility of the present rotary damper assembly is in regulating the flow volume of pneumatic fluid from a fluid source, such as cool air from the freezer compartment of refrigeration apparatus, to a destination, such as the fresh produce compartment, in response to a desired control function, such as a fresh food set point temperature. The fluid from the source is received by the nested cylinders through axially located inlet apertures, including a first inlet aperture 50 at the end of inner cylinder 14 which is opposite the annunciator 24, and a second inlet aperture 52 at an axial end of outer cylinder 12 opposite to the end receiving the inner cylinder 14.

The fluid is discharged from the assembly 10 through outlet apertures formed in the side wall of each of the cylinders. These include a first outlet aperture, with sections 54, 55, formed in sidewall 58 of the inner cylinder 14 and a second outlet aperture with sections 60, 61 formed in the sidewall 62 of outer cylinder 12. The area of each outlet aperture is application dependent, and is proportional to the maximum volume of fluid which must flow through the assembly at any instant of time. In the best mode embodiment the outlet aperture areas are shown sectioned for structural support purposes, which may not be required for all applications.

The maximum arc formed by the outlet apertures (the combined sections) along the circumference of each cylinder side wall is 180 degrees. Preferably, the sum arc of both outlet aperture sections is less than 160 degrees to provide an angular range of inner cylinder positions which ensure that there is no overlap between the first and second outlet aperture areas. This is the minimum flow condition, which is ideally zero but due to leakage through the nested sidewalls may have some value. Alternatively, when the inner cylinder 14 is rotated to provide full registration of the inner cylinder aperture sections 54, 55 with those 60, 61 of the outer cylinder, there is a maximum flow of the fluid (shown figuratively by the arrows 64.)

To minimize fluid leakage between the nested cylinder sidewalls in the minimum flow state, the inner cylinder may be provided with fluid sealing members. These include circumferential sealing members disposed in annular grooves 66, 68 formed along the circumference of each of the inner cylinder's axial ends and, electively, along the radial pedestal 22 of the outer cylinder 12. These circumferential sealing members limit axial fluid flowing between the cylinder sidewalls, and may comprise O-rings formed from material which is deemed suitable by those skilled in the art both for use with the particular fluid as well as durable with rotation of the inner cylinder in the nested environment. A lesser cost alternative, which is application specific, may be the use of a grease lubricant deposited in the in the annular grooves. This may be particularly true for a damper assembly used in refrigeration equipment where the lubricant maintains a higher degree of viscosity due to the cooler temperature. This lubricant may be any suitable known type, and preferably is a synthetic hydrocarbon oil, such as NYE Flouro Carbon Gel 807.

To limit the radial flow of fluid within the interstice of the nested sidewalls, longitudinal sealing members 70–72 are used. These members are in the form of ribs disposed along the length of the cylinder sidewall, which also provide structural support and rigidity to the inner cylinder. In the best mode embodiment of a rotary damper assembly for use in consumer refrigerators, where cost is a consideration, the outer and inner cylinders 12, 14 are molded polystyrene structures. Preferably the cylinders are injection molded from a high impact polystyrene (HPS), such as API545-21 manufactured by American Polymers, Inc., using known processes. The rib sealing members 70–72 may then be molded directly into the cylinder structure. The ribs provide friction contact with the inner surface of the outer cylinder sidewall to provide sufficient fluid sealing, while not adversely affecting the rotatability of the inner cylinder. If deemed necessary by those skilled in the art, silicon based material additives may be added to the HPS to improve lubrication.

As described above, the applied use of the rotary damper assembly configuration described in this best mode embodiment is to its use in gated operation in which the parent control system alternately commands the damper assembly to gate full open (maximum flow, with substantially full registration of the nested cylinder outlet apertures) to full closed (minimum flow, with no overlap of any of the outlet aperture areas). The bistable states of the assembly in each of these full open and full closed states is illustrated in the following Figures, in which common reference numerals are used to denote common elements among Figures.

Figure 2:
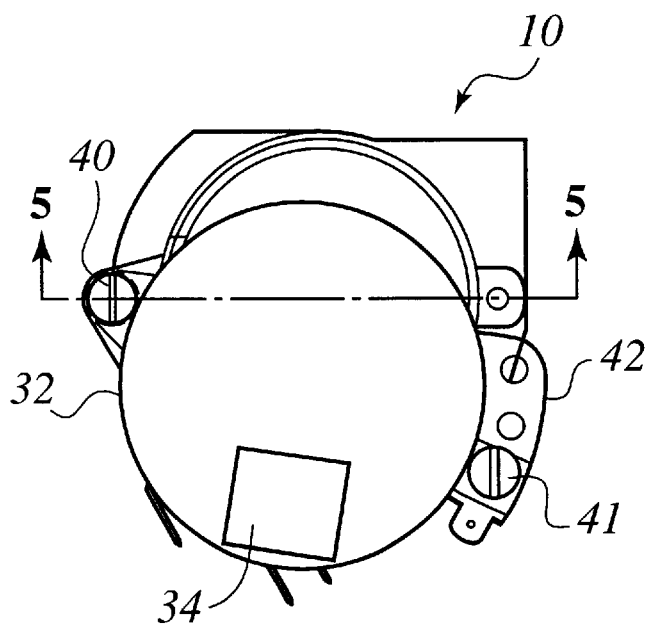
FIG. 2, is a plan view of the assembly of FIG. 1.
Figure 3:
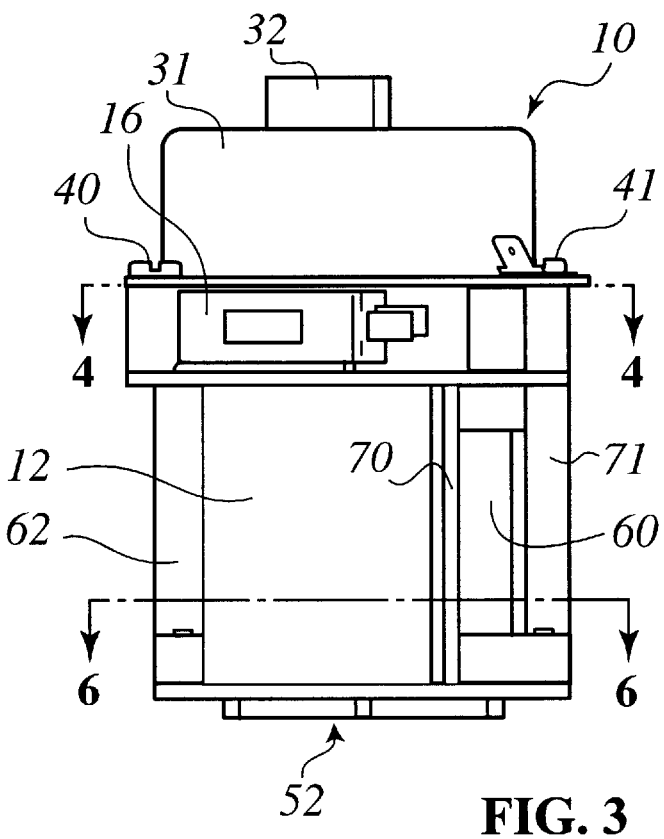
FIG. 3, is an elevation view of the assembly of FIG. 1.
Figure 4:
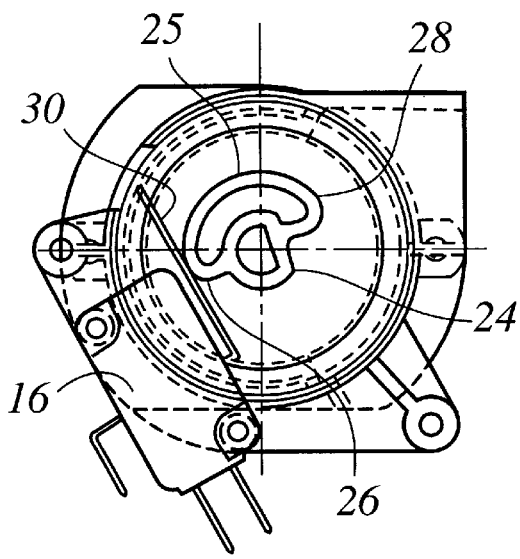
FIGS. 4 and 4A are plan views of the radial section taken along the line 4—4 of FIG. 3, each illustrating a different operating position of the rotary damper assembly of FIG. 1.
Figure 5:
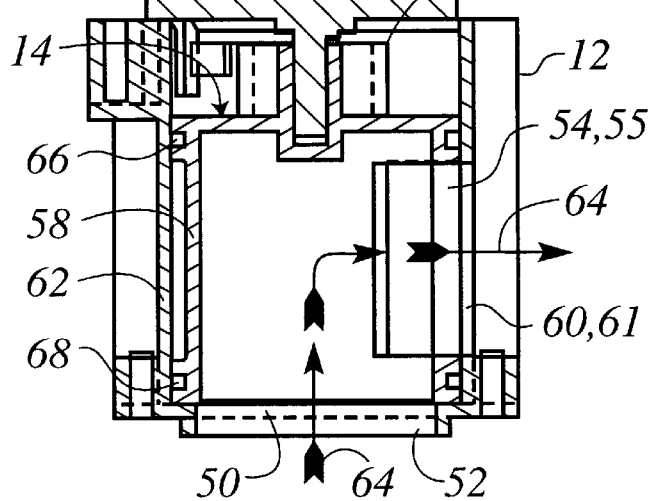
FIGS. 5 and 5A are elevation views taken along the line 5—5 of FIG. 2, each illustrating a different operating position of the rotary damper assembly of FIG. 1.
Figure 6:
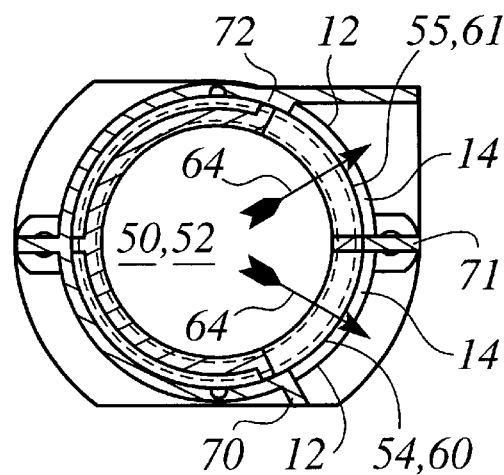
FIGS. 6 and 6A are plan views of the radial section taken along the line 6—6 of FIG. 3, each illustrating a different operating position of the rotary damper assembly of FIG. 1.

FIGS. 2 and 3 are plan and elevation views, respectively, of the top and side of the assembled rotary damper assembly of FIG. 1, and are used here to reference the sectioned assembly views illustrated in FIGS. 4–6. FIG. 5 is a sectioned elevation taken along the line 5—5 of FIG. 2, and illustrating the full open state of the rotary damper assembly 10 which is coincident with full, or maximum registration of the first outlet apertures sections 54, 55 of the inner cylinder 14 with the second outlet aperture 60, 61 of the outer cylinder 12. This is the maximum flow condition in which substantially the full volume of fluid flow 64 received through the first and second inlet apertures 50, 52 exits through the registered outlet apertures.

FIG. 4 is a radial section taken along the line 4—4 of FIG. 3, and it illustrates the position of the position annunciator device 24 at the full open state illustrated in FIG. 5. The endpoint 26 of the contoured surface 25 is in contact with the reed element 30 of the switch 16. In response to the contact the reed element switched the throw position of the single pole, double throw switch 16 thereby deactivating the motive source 18 and stopping the inner cylinder at the end position. FIG. 6 is a radial section taken along the line 6—6 of FIG. 3, and it illustrates the coincident relative position of the first and second outlet aperture sections 54,55 and 60, 61, respectively, in the full registered position, or the maximum flow state.

Figure 4A:
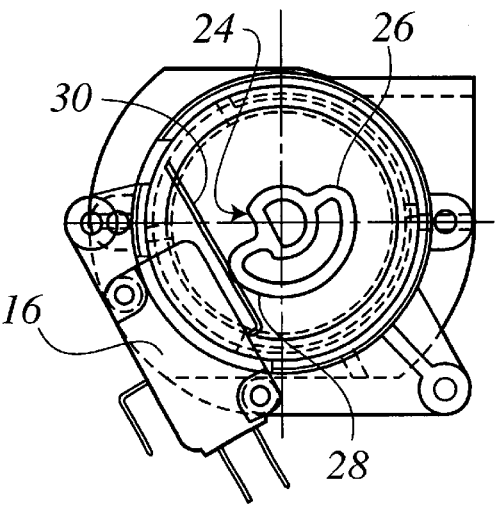

In response to a command signal, which in the present gated mode embodiment is a 115 volt signal applied to the opposite throw position of the switch 16, as described hereinbefore with respect to FIG. 7. In the present embodiment the inner cylinder rotation is in the counterclockwise direction until the opposite end point 28 of the annunciator 24 strikes the reed 30 of the switch, as shown in FIG. 4A. The switch changes states, deactivating the motor and stopping rotation of the inner cylinder at a position corresponding to the fully closed, minimum flow, non-registration state of the outlet apertures.

Figure 5A:
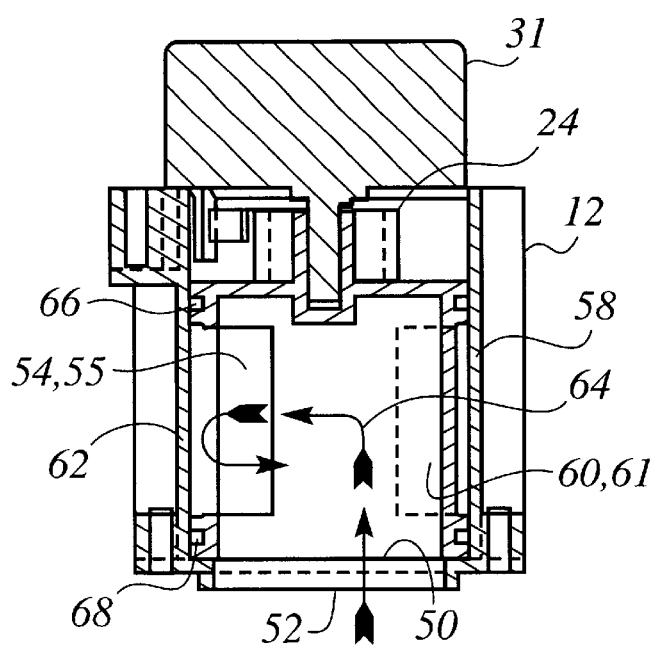
Figure 6A:
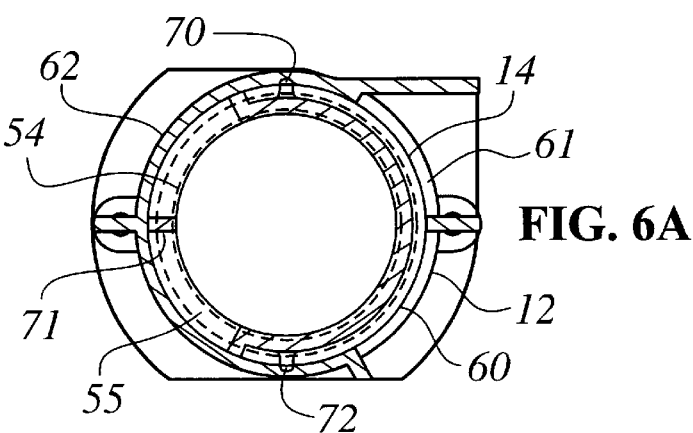

FIGS. 5A and 6A illustrate the opposing positions of the first and second outlet aperture sections 54, 55 and 60, 61, respectively, in the non-registered position, or minimum flow state. As seen the fluid flow 64 is blocked and, with the exception of a minimal leakage flow past the sealing members the flow to the temperature controlled compartment (the fresh produce compartment) is reduced to a minimum; typically 5% or less, and ideally zero. As a result of the ability of the rotary damper assembly to quickly slew from its full opened to full closed positions, the fresh food compartment temperature is quickly lowered to the fresh food compartment set point temperature with little or no over run of the fresh food compartment set point temperature.

The rotary damper assembly of the present invention has several unique features which provide improved performance, while reducing the cost to manufacture and maintain. Since the damper is designed to operate rotationally it is not necessary to convert rotational motion of a motor to linear motion to slide or push a damper door as is done with prior art motorized refrigeration dampers. This results in higher efficiency, less parts, smaller size, and a simpler design that is easier to assemble. The rotational motion may be unidirectional, thereby eliminating the functional parts required to otherwise produce oscillating motion. Finally, the ration of the permitted flow area of the outlet apertures to the overall size of the assembly is significantly higher than linear type dampers since there is no need to convert rotational motion of the motor into linear motion to slide a damper door.

Although the invention has been shown and described with respect to a best mode embodiment thereof, it should be understood by those skilled in the art that various changes, omissions, and additions may be made to the form and detail of the disclosed embodiment without departing from the spirit and scope of the invention, as recited in the following claims.

We claim:

1. Apparatus for regulating the volume of fluid flowing received from a fluid source, comprising:
    an inner cylinder, having a side wall and a hollow interior, said inner cylinder including a first inlet aperture at one axial end thereof for receiving the fluid into the hollow interior and including a first outlet aperture in said side wall for discharging the fluid, said inner cylinder being adapted for coaxial mounting within an outer cylinder; and
    a housing, having an outer cylinder, said outer cylinder including a side wall having a second outlet aperture for discharging fluid and a hollow interior adapted to receive said inner cylinder therein in a nested relationship which permits relative rotation of said cylinders about a common longitudinal axis to selectably provide maximum registration and, alternately, minimum registration of said first and said second outlet apertures, said outer cylinder further including at an axial end thereof a second inlet aperture adapted for fluid communication with the fluid source and with said first inlet aperture of said nested inner cylinder, whereby selectable rotation of said cylinders regulates the fluid volume flowing from said second inlet aperture to said second outlet aperture, from a maximum flow to a minimum flow, in response to maximum registration and minimum registration, respectively, of said first and said second outlet apertures.

2. The apparatus of claim 1, wherein said outer cylinder is stationary relative to axial rotation of said inner cylinder.

3. The apparatus of claim 1, further comprising fluid sealing members disposed on the outer surface of said inner cylinder side wall to restrict fluid flow through the nested combination of said inner and said outer cylinders to a flow path between said second inlet aperture and said second outlet aperture.

4. The apparatus of claim 3, wherein said fluid sealing members are disposed along the circumference of each longitudinal end of said inner cylinder.

5. The apparatus of claim 3, wherein said fluid sealing members are disposed longitudinally along the outer surface of said side wall of said inner cylinder.

6. The apparatus of claim 5, wherein at least one each of said fluid sealing members are disposed substantially adjacent to each longitudinal side of said first outlet aperture.

7. The apparatus of claim 2, further comprising:
    a source of rotational motive power, adapted to engage said inner cylinder at an other axial end thereof, said source of motive power being selectably actuated to rotate said inner cylinder to establish a degree of registration of said first aperture with said second aperture, as necessary to provide a desired amount of fluid flow through the apparatus.

8. The apparatus of claim 7, wherein said source of rotational motive power comprises an electrical motor.

9. The apparatus of claim 8, further comprising:
    actuation means, disposed on said other axial end of said inner cylinder to provide the engagement thereof to said source of rotational motive power, said actuation means being responsive to operator control for selectably actuating said source of rotational motive power to rotate said inner cylinder incrementally, through a plurality of rotational positions relative to said outer cylinder, including rotational positions corresponding to maximum registration and minimum registration of said first and said second outlet apertures.

10. The apparatus of claim 9, wherein said actuation means comprises:
    a position control device, disposed on said other axial end of said inner cylinder and rotatable therewith, said position control device including a contoured surface extending radially of said common longitudinal axis and having surface indicia disposed thereon, each said indicia being associated with a different one of a plurality of said rotational positions of said inner cylinder; and
    a proximity switch, responsive to the rotational position of said contoured surface and to operator control, for actuating said source of rotational motive power in response to operator command and for de-actuating said source in response to the proximity thereat of each said surface indicia.

11. The apparatus of claim 10, wherein said surface indicia are associated with said rotational positions corresponding substantially to maximum fluid flow and minimum fluid flow therethrough.

12. The apparatus of claim 11, wherein said actuation means actuates said source of motive power to rotate said inner cylinder in a common rotational direction between said rotational positions corresponding to maximum fluid flow and minimum fluid flow.

13. The apparatus of claim 7, further comprising fluid sealing members disposed on the outer surface of said inner cylinder side walls to substantially limit fluid flow through the nested combination of said inner and said outer cylinders to a flow path between said second inlet aperture and said second outlet aperture.

14. The apparatus of claim 13, wherein said fluid sealing members are disposed along the circumference of each longitudinal end of said inner cylinder.

15. The apparatus of claim 14, wherein said fluid sealing members are disposed longitudinally along the outer surface of said side wall of said inner cylinder.

16. The apparatus of claim 15, wherein at least one each of said fluid sealing members are disposed substantially adjacent to each longitudinal side of said first outlet aperture.

17. Rotary damper assembly, for regulating the flow volume of cooling air presented from a lower temperature compartment of refrigeration apparatus to a higher temperature compartment therein, in response to command signals presented from a refrigeration apparatus control system for the purpose of regulating the higher temperature compartment to a set point, comprising:

an inner cylinder, having a side wall and a hollow interior, said inner cylinder including a first inlet aperture at one axial end thereof for receiving the cool air from the lower temperature compartment into the hollow interior and including a first outlet aperture in said side wall for discharging the cool air therefrom, said inner cylinder being adapted for coaxial mounting within an outer cylinder; and a housing, having an outer cylinder, said outer cylinder including a side wall having a second outlet aperture for discharging fluid and a hollow interior adapted to receive said inner cylinder therein in a nested relationship which permits relative rotation of said inner and said outer cylinders about a common longitudinal axis to selectably provide maximum registration and, alternately, minimum registration of said first and said second outlet apertures, said outer cylinder further including at an axial end thereof a second inlet aperture adapted for fluid communication with the lower temperature compartment and with said first inlet aperture of said nested inner cylinder, whereby selectable rotation of said cylinders regulates the cool air volume flowing from said second inlet aperture to said second outlet aperture from maximum flow to minimum flow in response to maximum registration and minimum registration, respectively, of said first and said second outlet apertures.

18. The apparatus of claim 1, wherein said outer cylinder is stationary relative to axial rotation of said inner cylinder.

19. The apparatus of claim 17, further comprising fluid sealing members disposed on the outer surface of said inner cylinder side wall to substantially limit fluid flow through the nested combination of said inner and said outer cylinders to a flow path between said second inlet aperture and said second outlet aperture.

20. The apparatus of claim 18, further comprising:

a source of rotational motive power, adapted to engage said inner cylinder at an other axial end thereof, said source of motive power rotating said inner cylinder in response to a received command signal from the control system to establish a degree of registration of said first aperture with said second aperture, as necessary to provide a desired amount of cool air flow through the damper assembly.

21. The apparatus of claim 20, wherein said source of rotational motive power comprises an electrical motor.

22. The apparatus of claim 21, further comprising:

actuation means, disposed on said other axial end of said inner cylinder to provide the engagement thereof to said source of rotational motive power, said actuation means being responsive to the command signals from the refrigeration apparatus control system to selectably actuate said source of rotational motive power to rotate said inner cylinder incrementally, through a plurality of rotational positions relative to said outer cylinder, including rotational positions corresponding to maximum registration and minimum registration of said first and said second outlet apertures.

23. The apparatus of claim 22, wherein said actuation means comprises:

a position control device, disposed on said other axial end of said inner cylinder and rotatable therewith, said position control device including a contoured surface extending radially of said common longitudinal axis and having surface indicia disposed thereon, each said indicia being associated with a different one of a plurality of said rotational positions of said inner cylinder; and a proximity switch, responsive to the rotational position of said contoured surface and to operator control, for actuating said source of rotational motive power in response to a command signal from the refrigeration apparatus control system and for de-actuating said source in response to the proximity thereat of each said surface indicia.

24. The apparatus of claim 23, wherein said surface indicia are associated with said rotational positions corresponding substantially to maximum cool air flow and minimum cool air flow therethrough.

25. The apparatus of claim 24, wherein said actuation means actuates said source of motive power to rotate said inner cylinder in a common rotational direction between said rotational positions corresponding to maximum fluid flow and minimum fluid flow.

26. The apparatus of claim 20, further comprising fluid sealing members disposed on the outer surface of said inner cylinder side walls to substantially limit fluid flow through the nested combination of said inner and said outer cylinders to a flow path between said second inlet aperture and said second outlet aperture.

27. The apparatus of claim 26, wherein said fluid sealing members are disposed along the circumference of each longitudinal end of said inner cylinder.

28. The apparatus of claim 26, wherein said fluid sealing members are disposed longitudinally along the outer surface of said side wall of said inner cylinder.

29. The apparatus of claim 28, wherein at least one each of said fluid sealing members are disposed substantially adjacent to each longitudinal side of said first outlet aperture.

* * * * *